United States Patent Office 2,694,068
Patented Nov. 9, 1954

2,694,068

Δ⁶-DESOXYMORPHINE COMPOUNDS AND PROCESSES OF PREPARING THE SAME

George B. Payne, Berkeley, Calif., and Karl Pfister III, Westfield, N. J., assignors to Merck & Co., Inc., Rahway, N. J., a corporation of New Jersey No Drawing. Original application May 8, 1952, Serial No. 286,812. Divided and this application August 20, 1953, Serial No. 375,566

9 Claims. (Cl. 260—285)

This invention is concerned generally with novel derivatives of morphine and with processes for preparing these morphine derivatives. More particularly, it relates to Δ⁶-desoxymorphine compounds having a lower alkyl substituent attached to the carbon atom in the 6-position of the molecule, to the lower alkanoyl esters of said compounds, and acid salts thereof, new compounds which possess superior analgesic activity, and to the process of preparing these new analgesic substances starting with the corresponding 6-alkyldihydromorphines.

This application is a division of our co-pending application Ser. No. 286,812, filed May 8, 1952.

The 6-alkyl-Δ⁶-desoxymorphines, their lower alkanoyl esters, and salts thereof, subject of the present invention may be chemically represented by the following structural formulae:

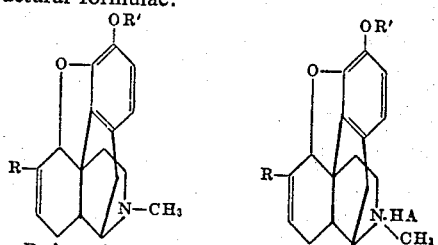

wherein R is a lower alkyl substituent, R' is hydrogen or a lower alkanoyl radical, and HA is an acid.

The chemical relationship of the 6-alkyl-Δ⁶-desoxymorphines, and their esters, to morphine is clear from a comparison of the foregoing formulae with the structural formula of morphine which is as follows:

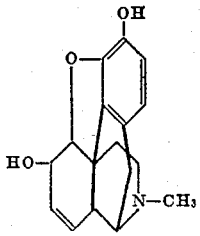

Although the alkaloid morphine has for centuries been known to possess analgesic activity, the contribution of each and every characteristic portion of this complex molecule to the analgesic and narcotic properties is still not fully understood. Extensive research has established the chemical structure of this important narcotic, and has given some indications as to the effect of certain structural characteristics on analgesic activity. There is no way known, however, for predicting the pharmacological properties of derivatives prepared by introducing new substituents at various points in the morphine nucleus. Surprisingly enough, the new compounds, the 6-alkyl-Δ⁶-desoxymorphines, and their lower alkanoyl esters, and salts, have been found very much more active than morphine. For example, 6-methyl-Δ⁶-desoxymorphine has been found to possess over one hundred times the analgesic activity possessed by morphine itself. Moreover, 6-methyl-Δ⁶-desoxymorphine possesses, in addition to its extremely high potency, an extraordinary promptness of onset of analgesic action.

The 6-alkyl-Δ⁶-desoxymorphines, their lower alkanoyl esters and acid salts thereof, can be prepared by reactions which may be chemically represented as follows:

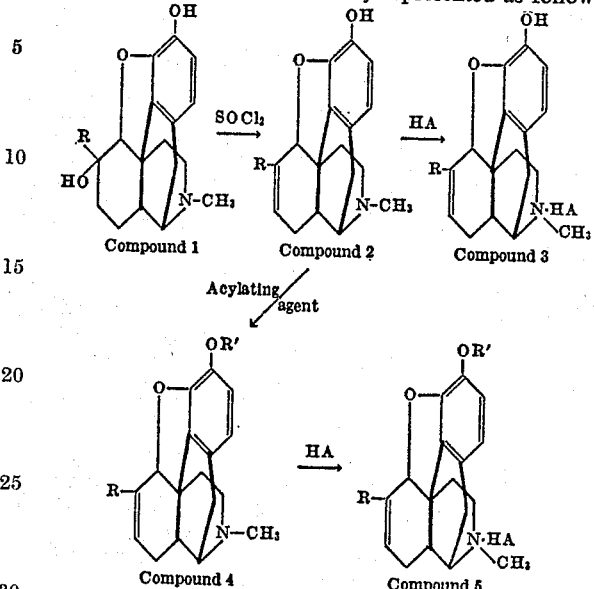

wherein R is a lower alkyl radical, R' is a lower alkanoyl radical, and HA is an acid.

The reactions, indicated hereinabove, are conducted as follows: a 6-alkyldihydromorphine (Compound 1) is reacted with thionyl chloride thereby forming the corresponding 6-alkyl-Δ⁶-desoxymorphine (Compound 2); the latter compound is reacted with an acid to produce the corresponding acid salt of the 6-alkyl-Δ⁶-desoxymorphine (Compound 3); alternatively the 6-alkyl- Δ⁶-desoxymorphine is reacted with a lower alkanoic anhydride thereby producing the corresponding 3-alkanoyl-6-alkyl-Δ⁶-desoxymorphine (Compound 4) which is converted by reaction with an acid to the corresponding acid salt of 3-alkanoyl-6-alkyl-Δ⁶-desoxymorphine (Compound 5).

The 6-alkyl-dihydromorphine compounds used as starting materials are conveniently prepared by reacting dihydromorphinone with an ethereal solution of an alkyl lithium such as methyl lithium, ethyl lithium, propyl lithium, butyl lithium, and the like, thereby forming the corresponding 6-alkyl-dihydromorphine such as 6-methyl-dihydromorphine, 6-ethyl-dihydromorphine, 6-propyl-dihydromorphine, 6-butyl-dihydromorphine, and the like.

The reaction between the 6-alkyl-dihydromorphine and thionyl chloride is carried out by heating the reactants together in a liquid medium which is substantially inert under the reaction conditions and which is a solvent for the reactants. We ordinarily utilize, as the liquid medium, a chlorinated organic solvent as for example tetrachlorethane, carbon tetrachloride, and the like. We prefer, however, to use a chlorinated organic solvent having a boiling point within the range of 55–90° C., such as chloroform, and to conduct the reaction by heating the reactants together in said solvent under reflux. Under these preferred reaction conditions, whereby decomposition of the morphine molecule is minimized, we have found that a prolonged reaction time of at least about fifteen hours is needed in order to obtain appreciable conversion of the 6-alkyl-dihydromorphine to the desired 6-alkyl-Δ⁶-desoxymorphine, even where a large excess of thionyl chloride is employed. Using boiling chloroform as the liquid medium, we prefer to use at least a 50% excess of thionyl chloride, and to carry out the reaction for a period of time within the range of about 15–20 hours.

The 6-alkyl-Δ⁶-desoxymorphine thus obtained, such as 6-methyl-Δ⁶-desoxymorphine, 6-ethyl-Δ⁶-desoxymorphine, 6-propyl-Δ⁶-desoxymorphine, 6-butyl-Δ⁶-desoxymorphine, and the like, is recovered by neutralizing the acidic reaction mixture to a pH of at least about 8 by shaking the chlorinated organic solvent solution with an aqueous alkaline solution, for example aqueous ammonium hydroxide, aqueous ammonium carbonate, aqueous alkali metal hydroxides, aqueous alkali metal carbonates, aqueous alkaline earth metal hydroxides, aqueous alkaline earth metal carbonates, and the like. We prefer to utilize aqueous ammonium hydroxide as the aqueous alkaline solution. The neutralized chlorinated organic solvent is then evaporated to give the desired 6-alkyl-$\Delta^6$-desoxymorphine which can be purified by distillation in vacuo or by recrystallization from an organic solvent such as acetone, isopropanol, and the like.

The 6-alkyl-$\Delta^6$-desoxymorphine is then reacted with a lower alkanoic acid anhydride such as acetic anhydride, propionic anhydride, and the like, thereby esterifying the hydroxyl radical in the 3-position to form the corresponding 3 - alkanoyl - 6 - alkyl - $\Delta^6$ - desoxymorphine such as 3-acetyl-6-methyl-$\Delta^6$-desoxymorphine, 3-acetyl-6-ethyl-$\Delta^6$-desoxymorphine, 3-acetyl-6-propyl-$\Delta^6$-desoxymorphine, 3 - propionyl - 6 - methyl - $\Delta^6$ - desoxymorphine, 3-propionyl-6-ethyl-$\Delta^6$-desoxymorphine, 3-propionyl-6-butyl-$\Delta^6$-desoxymorphine, and the like. The reaction between the alkanoic acid anhydride and the 6-alkyl-$\Delta^6$-desoxymorphine is ordinarily conducted in the presence of a base, preferably a tertiary organic base such as pyridine, picoline, and the like. The 3-alkanoyl-6-alkyl-$\Delta^6$-desoxymorphine is conveniently recovered from the reaction mixture by pouring the latter onto crushed ice and extracting the aqueous mixture with a water-immiscible organic solvent such as chloroform. Upon evaporation of the chloroform there is obtained, as a residual material, the 3-alkanoyl-6-alkyl-$\Delta^6$-desoxymorphine which can be purified by recrystallization from an organic solvent such as ether.

The conversion of the 6-alkyl-$\Delta^6$-desoxymorphines, or its lower alkanoyl esters, the 3-alkanoyl-6-alkyl-$\Delta^6$-desoxymorphine, to the corresponding acid salts is ordinarily conducted by reacting the 6-alkyl-$\Delta^6$-desoxymorphine on the 3-alkanoyl-6-alkyl-$\Delta^6$-desoxymorphine, under substantially anhydrous conditions, with an acid, as, for example, hydrogen chloride, hydrogen bromide, sulfuric acid, and the like. This salt-forming reaction is conveniently carried out in a medium comprising a lower alkanol, such as ethanol, methanol, propanol, and the like. Upon diluting the alkanol reaction medium with ether there precipitates the acid salt of the 6-alkyl-$\Delta^6$-desoxymorphine, or the acid salt of 6-alkanoyl-6-alkyl-$\Delta^6$-desoxymorphine, such as 6-methyl-$\Delta^6$-desoxymorphine-hydrochloride, 6-methyl-$\Delta^6$-desoxymorphine-hydrobromide, 6-methyl-$\Delta^6$-desoxymorphine-sulfate, 6-ethyl-$\Delta^6$-desoxymorphine-hydrochloride, 6-ethyl-$\Delta^6$-desoxymorphine-hydrobromide, 6-ethyl-$\Delta^6$-desoxymorphine-sulfate, 6-propyl-$\Delta^6$-desoxymorphine-hydrochloride, 3-acetyl - 6 - methyl - $\Delta^6$ - desoxymorphine - hydrochloride, 3 - acetyl - 6 - methyl - $\Delta^6$ - desoxymorphine - hydrobromide, 3-acetyl-6-methyl-$\Delta^6$-desoxymorphine-sulfate, 3-acetyl-6-ethyl-$\Delta^6$-desoxymorphine-hydrochloride, 3-acetyl-6 - ethyl - $\Delta^6$ - desoxymorphine - hydrobromide, 3 - acetyl-6 - ethyl - $\Delta^6$ - desoxymorphine - sulfate, 3 - propionyl-6 - methyl - $\Delta^6$ - desoxymorphine-hydrochloride, 3 - propionyl - 6 - methyl - $\Delta^6$ - desoxymorphine - hydrobromide, 3 - propionyl - 6 - methyl - $\Delta^6$ - desoxymorphine - sulfate, 3 - propionyl - 6 - ethyl - $\Delta^6$ - desoxymorphine - hydrochloride, 3 - propionyl - 6 - ethyl - $\Delta^6$ - desoxymorphine-hydrobromide, 3 - propionyl - 6 - ethyl - $\Delta^6$ - desoxymorphine-sulfate, and the like. The salt thus formed is recovered from the alcoholic slurry by filtration or centrifugation.

The following examples illustrate methods of carrying out the present invention but it is to be understood that these examples are given for purposes of illustration and not of limitation.

*Example 1*

Five and three-tenths grams of dry 6-methyl-dihydromorphine (which can be prepared as set forth hereinbelow) was dissolved in 100 ml. of hot anhydrous, alcohol-free chloroform. The resulting solution was then heated at reflux temperature in a vessel protected from the atmosphere by means of a drying tube while adding thereto, dropwise with stirring, a solution containing 16.5 g. of thionyl chloride dissolved in 50 ml. of anhydrous chloroform. The addition of the thionyl chloride solution required approximately fifteen minutes, and during this period an oily solid appeared on the walls of the reaction vessel. The mixture was heated and stirred under reflux and, after a short time, the solid material redissolved to give a clear, pale-yellow mixture which was heated and stirred at reflux temperature for an additional period of eighteen hours.

The reaction mixture thus obtained, which was still pale-yellow in color, was cooled to room temperature, and poured into 150 ml. of water. Sufficient aqueous ammonium hydroxide solution was added to this aqueous mixture to adjust the pH to 8–9, and the resulting mixture was shaken in a separatory funnel. The chloroform layer was separated, washed with 50 ml. of water, and the chloroform was evaporated therefrom. The residual solid was dissolved in a minimum amount of hot isopropanol, and sufficient hot water was added to cloud the solution. The resulting aqueous isopropanol solution was cooled whereupon a white solid separated, and, after allowing the resulting slurry to stand at 0° C. for several hours, this white solid material was recovered by filtration. This product was purified by recrystallization from a concentrated isopropanol solution to give crystals of 6-methyl-$\Delta^6$-desoxymorphine; M. P. 223–226° C. A sample of this material was sublimed at a temperature of about 180° C., at a pressure of 0.1 mm. to give substantially pure 6-methyl-$\Delta^6$-desoxymorphine; M. P. 224–226° C.; $[\alpha]^{25}_D$ C.=190° (1% solution in ethanol). *Analysis.*—Calc'd for $C_{18}H_{21}O_2N$: C, 76.4; H, 7.4. Found: C, 76.0; H, 7.6.

A sample of 6-methyl-$\Delta^6$-desoxymorphine, prepared as described hereinabove was dissolved in ethanol, and to the resulting solution was added an ethanolic solution of hydrogen chloride. The resulting solution was diluted with an equal volume of ether, and the ethereal-ethanol reaction mixture was allowed to stand for a period of several hours at a temperature of about 0° C. The crystalline material which separated was recovered by filtration and dried to give substantially pure 6-methyl-$\Delta^6$-desoxymorphine hydrochloride; M. P. 270–275° C.

Similarly, an ethanol solution of 6-methyl-$\Delta^6$-desoxymorphine was reacted with an ethanolic solution of hydrogen bromide, and the resulting mixture was diluted with ether and allowed to stand in the cold as in the foregoing procedure. The crystalline material which separated was recovered by filtration and dried to give substantially pure 6-methyl-$\Delta^6$-desoxymorphine hydrobromide; M. P. 278–282° C. dec.

The 6-methyl-dihydromorphine, utilized as starting material in our process was prepared as follows: Thirteen and one-half grams (0.047 mole) of solid dihydromorphine were added, with stirring, over a twenty-minute period, to 107 ml. of a 1.3 molor solution of methyl-lithium in absolute ether (0.14 mole of $CH_3Li$). The resulting mixture was stirred for an additional period of forty-five minutes while maintaining the temperature of the mixture at approximately 20° C. The reaction mixture was then added to a cold dilute aqueous solution of acetic acid, and sufficient ammonium hydroxide was added to the resulting mixture to adjust the pH to approximately 9. The aqueous alkaline solution was then extracted with chloroform, and the chloroform extract was evaporated to dryness in vacuo. The residual material was recrystallized from 200 ml. of acetone to give 6-methyl-dihydromorphine; M. P. 210–211° C.

*Example 2*

Eight grams of 6-ethyl-dihydromorphine (which can be prepared as set forth hereinbelow) were dissolved in alcohol-free chloroform and the solution warmed to reflux temperature. Fifteen milliliters of thionyl chloride were added to the refluxing solution, vigorous stirring being maintained throughout addition. The resulting solution was heated under reflux for a period of about twenty hours, and the reaction solution was cooled and poured into water. The pH of the aqueous chloroform mixture was adjusted to 9 by the addition of ammonium hydroxide. The chloroform layer was separated, washed with water, and the chloroform evaporated in vacuo. The crude residual material was recrystallized several times from ethyl acetate to give pure 6-ethyl-$\Delta^6$-desoxymorphine; M. P. 119–121° C., $[\alpha]^{25°}_D$ C.=190° (ethyl alcohol).

The 6-ethyl dihydromorphine, utilized as starting material in our process was prepared as follows: Ten grams (0.035 mole) of dihydromorphinone was added over a twenty-minute period to 250 ml. of an ethereal solution containing 0.11 mole of ethyl lithium. The mixture was stirred at room temperature for a period of about forty-five minutes. The reaction mixture was poured into cold dilute aqueous acetic acid solution and the resulting solution made alkaline to pH 9 with ammonium hydroxide. The basic solution was evaporated with chloroform, and the chloroform evaporated from the chloroform extract to give a crude amorphous product, which, upon recrystallization from acetone, gave substantially pure 6-ethyl-dihydromorphine, M. P. 212–213° C.; $[\alpha]_D^{25°\ C.}=141°$ (ethyl alcohol). *Analysis.*—Calc'd for $C_{19}H_{25}O_3N$: C, 72.35; H, 7.99; N, 4.44. Found: C, 72.76; H, 8.13; N, 4.48.

*Example 3*

Sixty-four one-hundredths of a gram of 6-methyl-$\Delta^6$-desoxymorphine was dissolved in 20 ml. of pyridine. To this solution was added, with cooling and stirring, 3 ml. of acetic anhydride. The solution was allowed to stand for a period of about fifteen hours at room temperature. The reaction solution was poured onto crushed ice, and the aqueous mixture was extracted with chloroform. The chloroform extract was washed with cold aqueous sodium bicarbonate solution and with water, and the washed chloroform extract was evaporated to dryness in vacuo. Trituration of the residue with 3 ml. of ether gave a crystalline solid which was twice recrystallized from ether to give substantially pure 3-acetyl-6-methyl-$\Delta^6$-desoxymorphine; M. P. 168–169° C.; $[\alpha]_D^{25°\ C.}=-206°$ (ethyl alcohol). *Analysis.*—Calc'd for $C_{20}H_{23}O_3N$: C, 73.82; H, 7.12; N, 4.31. Found: C, 73.76, H, 7.13; N, 3.92.

The 3-acetyl-6-methyl-$\Delta^6$-desoxymorphine was dissolved in ethanol and an ethanolic solution of hydrogen chloride was added to the solution. Ethyl ether was added to the alcoholic mixture and the precipitated material was recovered by filtration and dried to give 3-acetyl-6-methyl-$\Delta^6$-desoxymorphine hydrochloride; M. P. 285–290° C.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group which consists of $\Delta^6$-desoxymorphine compounds having the formula:

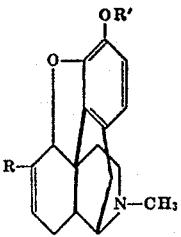

wherein R is a lower alkyl radical, R' is a lower alkanoyl radical, and salts thereof.

2. Compounds having the formula

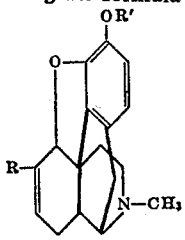

wherein R is a lower alkyl radical and R' is a lower alkanoyl radical.

3. 3-acetyl-6-methyl-$\Delta^6$-desoxymorphine.
4. 3-acetyl-6-methyl-$\Delta^6$-desoxymorphine-hydrochloride.
5. 3-acetyl-6-methyl-$\Delta^6$-desoxymorphine.
6. 3-acetyl-6-ethyl-$\Delta^6$-desoxymorphine-hydrochloride.
7. The process which comprises reacting 6-alkyl-$\Delta^6$-desoxymorphine with a lower alkanoic acid anhydride to produce the corresponding 3-alkanoyl-6-alkyl-$\Delta^6$-desoxymorphine.
8. The process which comprises reacting 6-methyl-$\Delta^6$-desoxymorphine with acetic anhydride to produce 3-acetyl-6-methyl-$\Delta^6$-desoxymorphine.
9. The process which comprises reacting 6-ethyl-$\Delta^6$-desoxymorphine with acetic anhydride to produce 3-acetyl-6-ethyl-$\Delta^6$-desoxymorphine.

No references cited.